(12) United States Patent
Thill (10) Patent No.: US 8,567,548 B2
(45) Date of Patent: Oct. 29, 2013

(54) INDEPENDENT REAR DRIVE SYSTEM

(76) Inventor: Leon A. Thill, Bensenville, IL (US)

(*) Notice: Subject to any disclaimer, the term of this patent is extended or adjusted under 35 U.S.C. 154(b) by 142 days.

(21) Appl. No.: 13/154,153

(22) Filed: Jun. 6, 2011

(65) Prior Publication Data

US 2012/0306177 A1  Dec. 6, 2012

(51) Int. Cl.
*B62D 61/08* (2006.01)

(52) U.S. Cl.
USPC ..... 180/215; 180/210; 180/348; 280/124.156

(58) Field of Classification Search
USPC ................. 180/210, 215, 217, 348, 358, 385; 280/124.156
See application file for complete search history.

(56) References Cited

U.S. PATENT DOCUMENTS

| | | | | |
|---|---|---|---|---|
| 1,422,512 | A * | 7/1922 | White, Jr. | 475/229 |
| 1,535,497 | A * | 4/1925 | Roche | 280/124.136 |
| 1,585,097 | A * | 5/1926 | Holle | 280/124.171 |
| 2,196,556 | A * | 4/1940 | Hollos | 180/363 |
| 2,806,543 | A * | 9/1957 | Nallinger | 180/360 |
| 3,155,186 | A * | 11/1964 | Cadmus et al. | 180/256 |
| 3,810,651 | A * | 5/1974 | Puchas | 280/124.105 |
| 3,924,706 | A * | 12/1975 | Figura | 180/89.14 |
| 4,003,443 | A | 1/1977 | Boughers | |
| 4,287,960 | A | 9/1981 | McConnell | |
| 4,325,449 | A | 4/1982 | D'Addio et al. | |
| 4,478,305 | A | 10/1984 | Martin, II | |
| 4,561,518 | A | 12/1985 | Grinde | |
| 4,669,571 | A * | 6/1987 | Kurde | 180/348 |
| 4,697,662 | A * | 10/1987 | Zollmeyer et al. | 180/256 |
| 4,905,787 | A | 3/1990 | Morin | |
| 5,494,129 | A * | 2/1996 | Krude et al. | 180/256 |
| 5,692,577 | A | 12/1997 | Dornbusch et al. | |
| 5,899,291 | A | 5/1999 | Dumais | |
| 6,581,715 | B2 | 6/2003 | Montague | |
| 6,675,926 | B2 | 1/2004 | Montague | |
| 6,827,361 | B2 * | 12/2004 | Seki | 280/124.134 |
| 6,964,314 | B1 | 11/2005 | Vey | |
| 7,077,409 | B2 * | 7/2006 | Epple et al. | 280/124.128 |
| 7,207,408 | B2 * | 4/2007 | Kuroki et al. | 180/210 |
| 7,228,930 | B1 | 6/2007 | Vey | |
| 7,311,167 | B2 * | 12/2007 | Takayanagi et al. | 180/215 |
| 7,690,661 | B2 * | 4/2010 | Tsuruta et al. | 280/124.135 |
| 7,762,368 | B2 * | 7/2010 | Matthies | 180/210 |
| 8,262,111 | B2 * | 9/2012 | Lucas | 280/124.103 |
| 2002/0101052 | A1 * | 8/2002 | Panizzolo | 280/124.111 |
| 2008/0135320 | A1 | 6/2008 | Matthies | |

* cited by examiner

*Primary Examiner* — Paul N Dickson
*Assistant Examiner* — Barry Gooden, Jr.
(74) *Attorney, Agent, or Firm* — Marshall, Gerstein & Borun LLP (57) ABSTRACT

An independent rear wheel drive assembly for three-wheeled motorcycles is provided having a wheel carrier adapted to rotatably support a wheel, and the wheel carrier includes an interior portion. Also provided is a control arm having a first end, a second end, and an interior portion. The first end of the control arm is pivotably coupled to the wheel carrier and the second end is pivotably coupled to a differential housing. A first end of a stabilizer bar is pivotably coupled to the wheel carrier and a second end is pivotably coupled to the differential housing. A first end of the drive shaft assembly is adapted to be coupled to the wheel and a second end is adapted to be coupled to a differential. Moreover, a portion of the drive shaft assembly is disposed within the interior portions of the wheel carrier and the interior portion of the control arm.

20 Claims, 10 Drawing Sheets

INDEPENDENT REAR DRIVE SYSTEM

FIELD OF THE DISCLOSURE

This disclosure relates to rear wheel drive assemblies in general and, more particularly, to a rear wheel drive assembly for use with a three-wheeled motorcycle.

BACKGROUND OF THE DISCLOSURE

Three-wheeled motorcycles are becoming increasingly popular, and there are numerous methods of modifying a conventional two-wheeled motorcycle to become a three-wheeled motorcycle, or trike. Specifically, the rear wheel support assembly of a conventional two-wheeled motorcycle can be removed from the frame of a two-wheeled motorcycle and an automobile rear axle can be coupled to the frame. A sprocket can be coupled to the rear axle and a drive chain can engage both the motorcycle engine and the sprocket of the rear axle to drive the wheels. The use of an automobile rear axle, however, has several drawbacks. For example, the automobile rear axle is heavy, making the three-wheeled motorcycle slow and difficult to maneuver. Additionally, the single rear axle does not allow each of the wheels to move independently, making the three-wheeled motorcycle difficult to control during turns and on rough terrain.

An alternative to the use of an automobile rear axle is the use of an independent rear suspension assembly, which allows each of the rear wheels to move independent of the other to improve handling and ride comfort. Typically, the independent rear suspension assembly includes two identical linkages formed on opposite sides of the motorcycle frame. Each independent rear suspension assembly typically includes a wheel assembly, and a drive shaft may be coupled to the wheel assembly and a portion of the power transmission assembly, such as the differential. A sprocket may be coupled to a portion of the power transmission assembly, and a drive chain may engage the sprocket and the motorcycle engine as described above. A linkage arm, or stabilizer arm, may be pivotably connected to the wheel assembly and a portion of the motorcycle frame, and the linkage arm may be disposed below the drive shaft to offer some protection to the drive shaft during operation. However, positioning the linkage arm below the drive shaft leaves little room between the ground surface and the linkage arm, and the linkage arm may be damaged by rocks and debris on the ground surface. Moreover, rocks, debris, and large branches on the ground surface may come in contact with, and consequently damage, the drive shaft during off-road use.

BRIEF SUMMARY OF THE DISCLOSURE

The independent rear wheel drive assembly of the present disclosure includes a wheel carrier adapted to rotatably support a wheel, and the wheel carrier includes an interior portion. The independent rear wheel drive assembly also includes a control arm having a first end, a second end, and an interior portion. The first end of the control arm is pivotably coupled to the wheel carrier and the second end of the control arm is pivotably coupled to a housing that is adapted to be coupled to a vehicle frame. The independent rear wheel drive assembly further includes a stabilizer bar having a first end and a second end, and the first end of the stabilizer bar is pivotably coupled to the wheel carrier and the second end of the stabilizer bar is pivotably coupled to the vehicle frame. The independent rear wheel drive assembly additionally includes a drive shaft assembly having a first end and a second end. The first end of the drive shaft assembly is adapted to be coupled to the wheel and the second end is adapted to be coupled to a power transmission assembly. In addition, a first portion of the drive shaft assembly is disposed within the interior portion of the wheel carrier and a second portion of the drive shaft assembly is disposed within the interior portion of the control arm.

DETAILED DESCRIPTION OF THE DISCLOSURE

Figure 1:
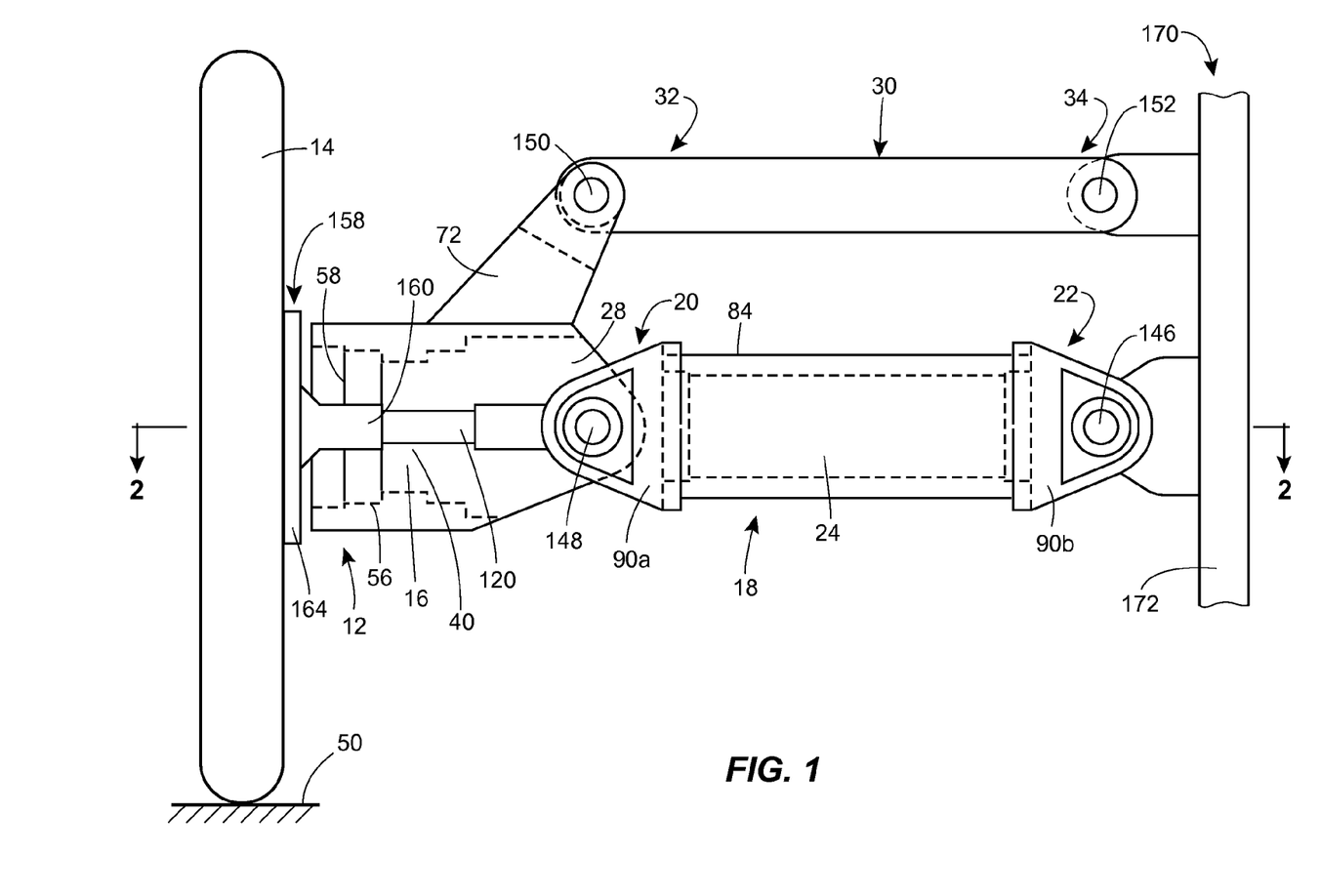
FIG. 1 is a front view of an independent rear wheel drive assembly of the present disclosure, with the first end of the drive shaft assembly visible within the wheel carrier for illustrative purposes.
Figure 13:
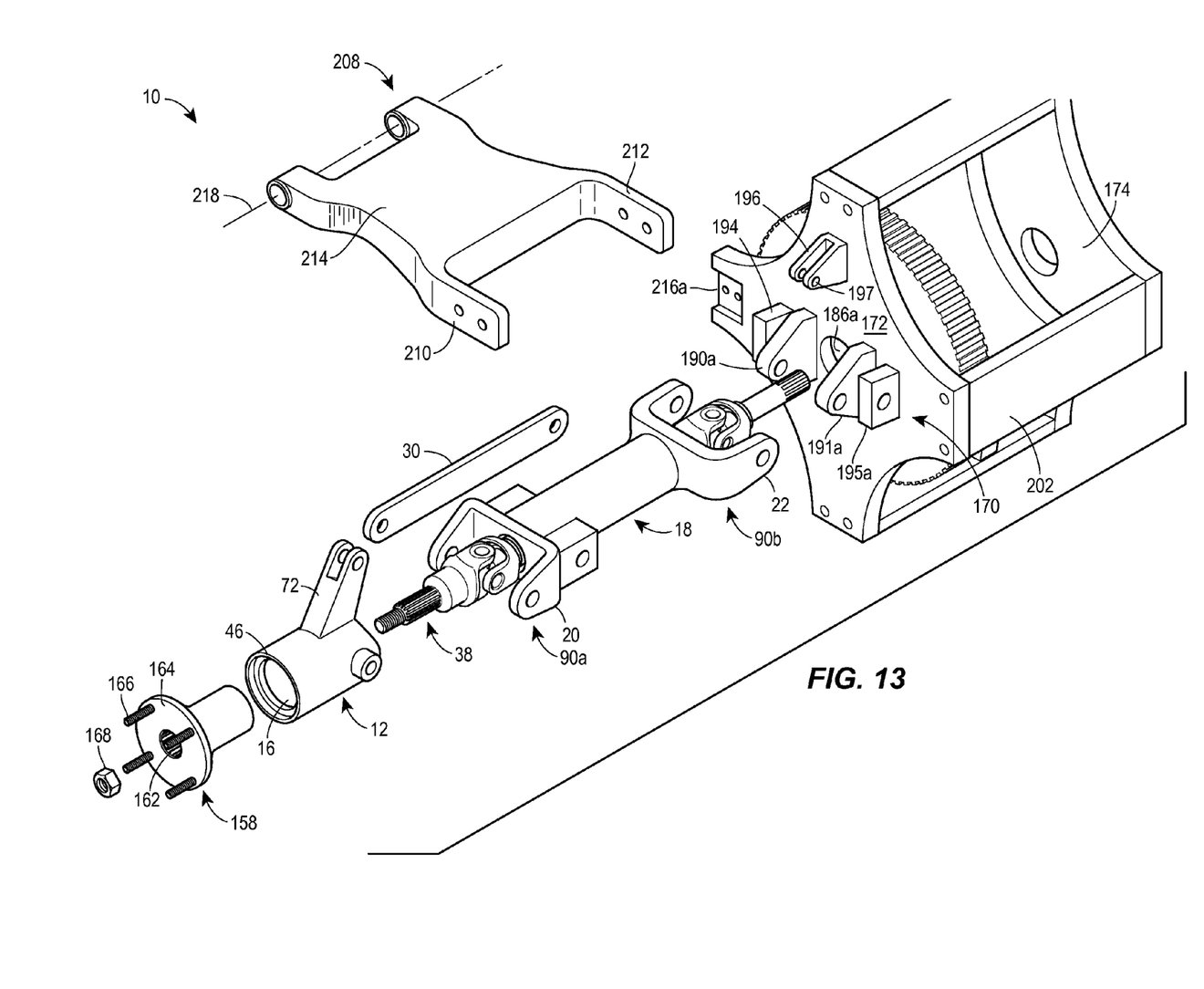
FIG. 13 is an exploded perspective view of an independent rear wheel drive assembly of the present disclosure.
Figure 14:
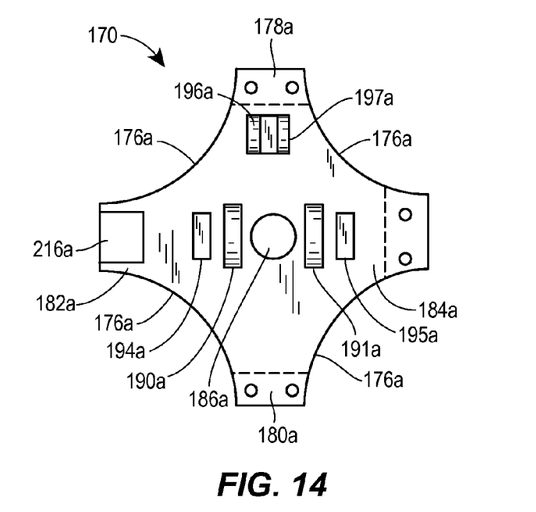
FIG. 14 is a side view of a differential housing of the assembly of the present disclosure.
Figure 15:
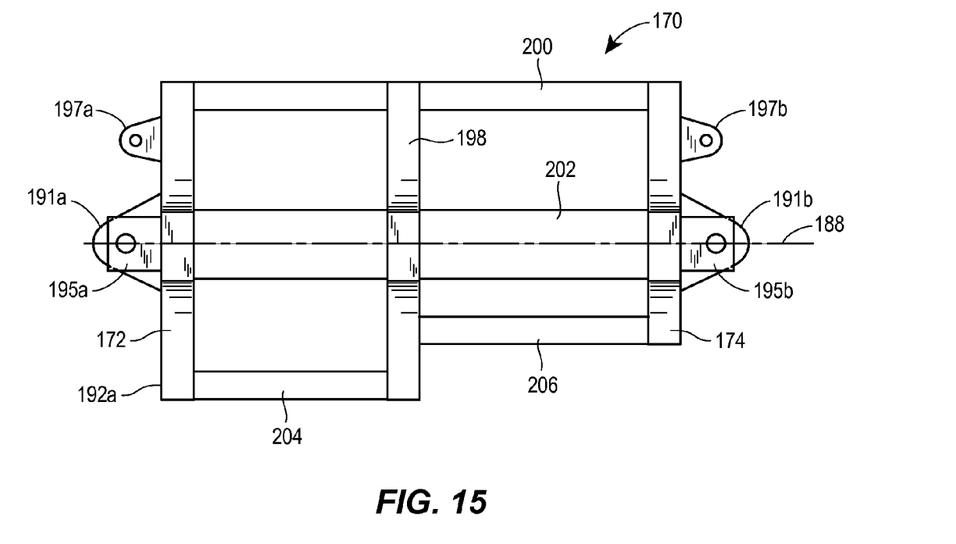
FIG. 15 is front view of the embodiment of the differential housing illustrated in FIG. 14.
Figure 16:
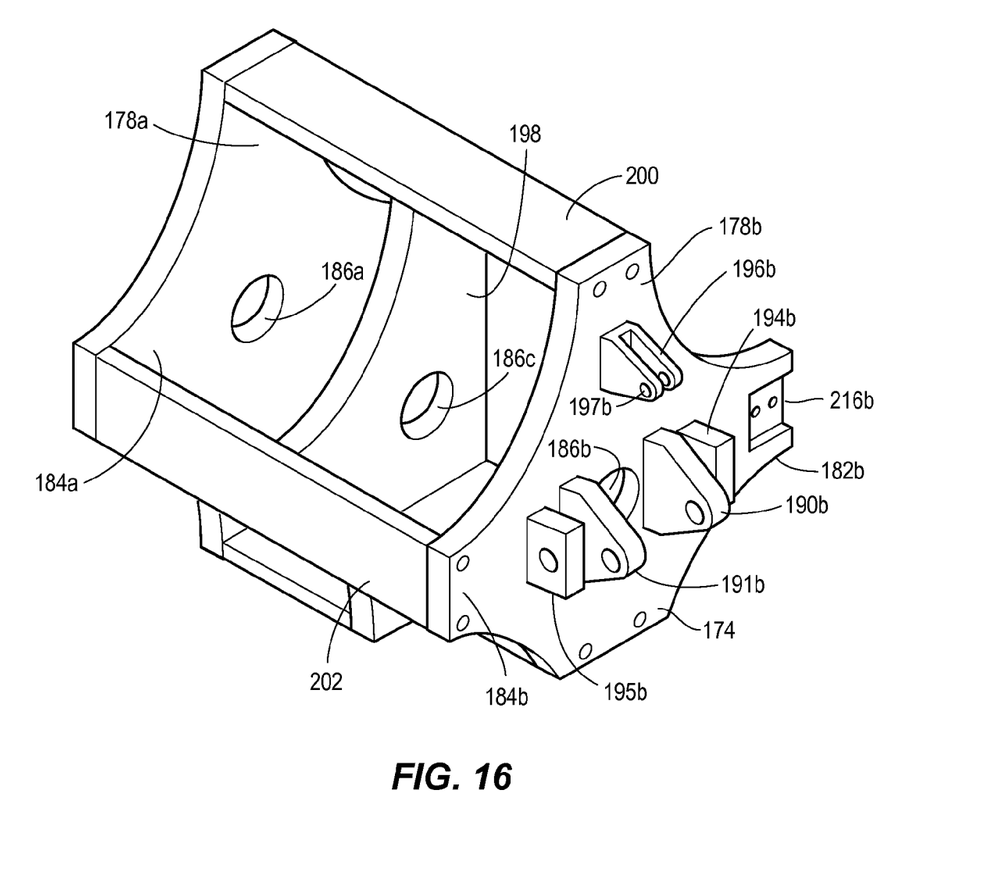
FIG. 16 is perspective view of the embodiment of the differential housing illustrated in FIG. 14.
Figure 17:
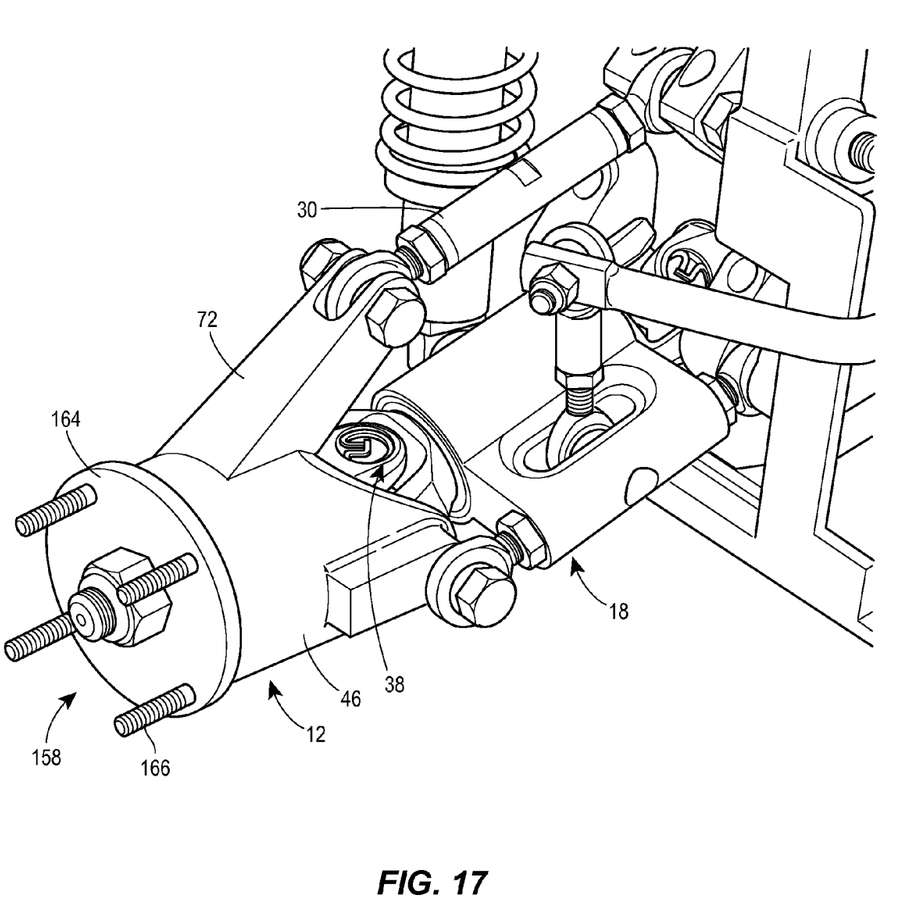
FIG. 17 is a perspective view of an independent rear wheel drive assembly of the present disclosure.

Provided is an independent rear wheel drive assembly 10, which generally includes a wheel carrier 12 adapted to rotatably support a wheel 14. The wheel carrier 12 has an interior portion 16, as illustrated in FIG. 1 and FIG. 13, and will be described in more detail below. The independent rear wheel drive assembly 10 also includes a control arm 18 having a first end 20, a second end 22, and an interior portion 24 (shown in FIG. 1 and FIG. 13). The first end 20 of the control arm 18 is pivotably coupled to the wheel carrier 12 and the second end 22 of the control arm 18 is pivotably coupled to a housing, such as a differential housing 170, that is adapted to be coupled to a vehicle frame (shown in FIG. 13). The independent rear wheel drive assembly 10 further includes a stabilizer bar 30 having a first end 32 and a second end 34. The first end 32 of the stabilizer bar 30 is pivotably coupled to the wheel carrier 12 and the second end 34 of the stabilizer bar 30 is pivotably coupled to the housing, such as the differential housing 170. In addition, the assembly 10 further includes a drive shaft assembly 38 having a first end 40 and a second end 42. The first end 40 of the drive shaft assembly 38 is adapted to be coupled to the wheel 14 and the second end 42 of the drive shaft assembly 38 is adapted to be coupled to a power transmission assembly 44 (shown in FIG. 3). As shown in FIG. 1, a first portion of the drive shaft assembly 38 is disposed within the interior portion 16 of the wheel carrier 12 and a second portion of the drive shaft assembly 38 is disposed within the interior portion 24 of the control arm 18.

Figure 4:
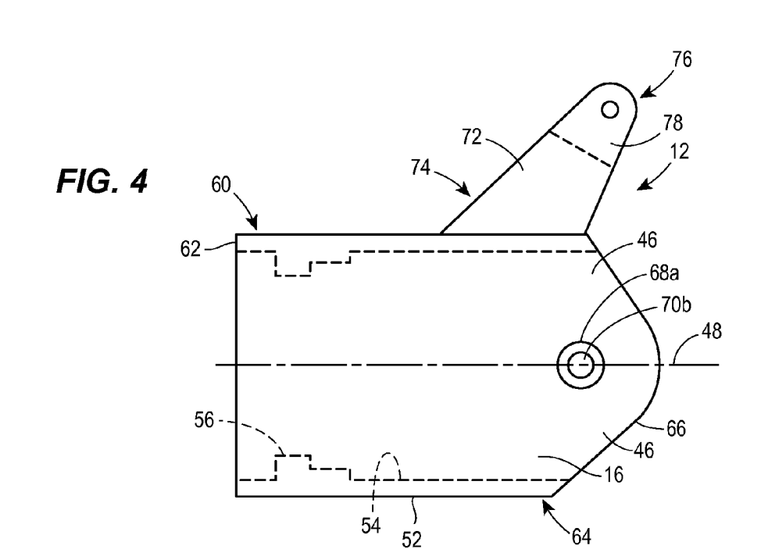
FIG. 4 is a side view of a wheel carrier of the assembly of the present disclosure.
Figure 5:
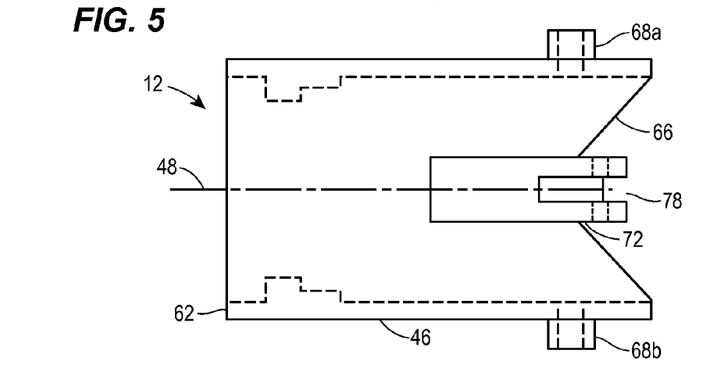
FIG. 5 is top view of the embodiment of the wheel carrier illustrated in FIG. 4.
Figure 6:
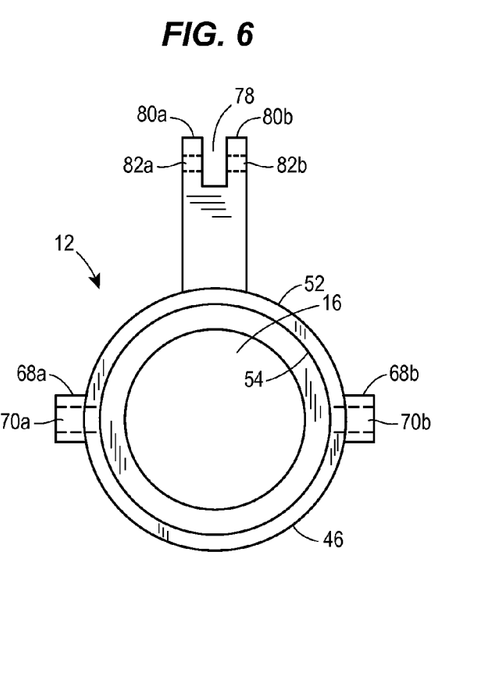
FIG. 6 is front view of the embodiment of the wheel carrier illustrated in FIG. 4.
Figure 7:
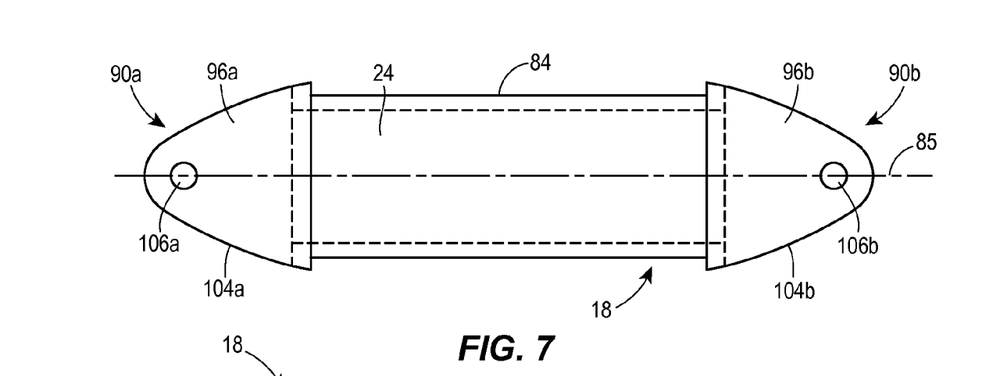
FIG. 7 is a side view of a control arm of the assembly of the present disclosure
Figure 8:
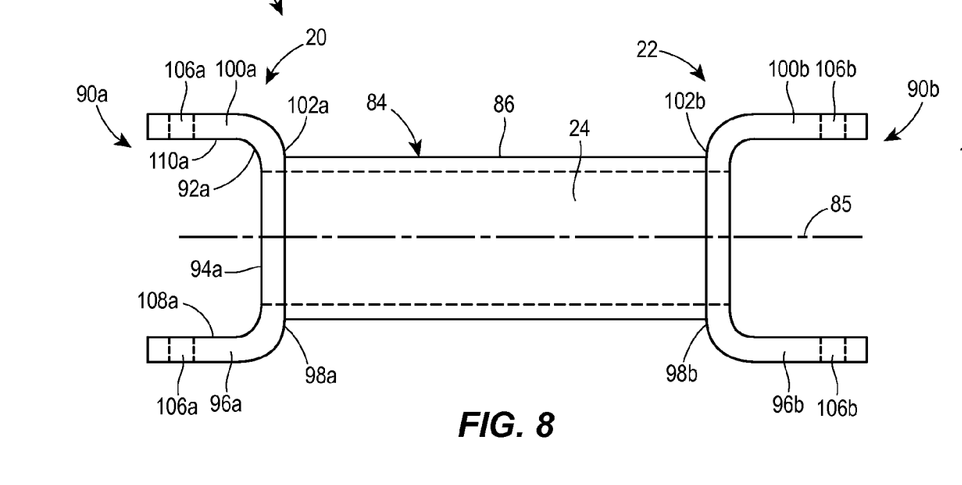
FIG. 8 is top view of the embodiment of the control arm illustrated in FIG. 7.
Figure 9:
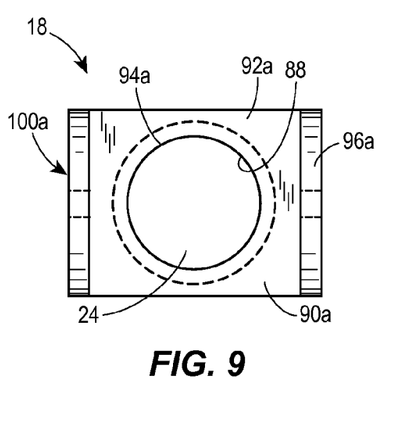
FIG. 9 is front view of the embodiment of the control arm illustrated in FIG. 7.

As illustrated in more detail in FIGS. 4-6, the wheel carrier 12 includes a carrier body 46 that extends along a carrier axis 48 that may extend in a substantially horizontal direction (i.e., a direction that is generally parallel to a ground surface 50 that supports the wheel 14 as shown in FIG. 1). The carrier body 46 may have any suitable cross-sectional shape, such as a square, a rectangle, a circle, an oval, or a polygon. For example, the carrier body 46 may have a circular cross-sectional shape such that the carrier body 46 takes the shape of a cylinder, as illustrated in FIG. 1. The carrier body 46 has an outer surface 52 and an inner surface 54 that defines the interior portion 16 that extends along the length of the carrier body 46. The interior portion 16 may have the same cross-sectional shape as that of the carrier body 46 itself, or the interior portion 16 may have a different cross-sectional shape than that of the carrier body 46. The inner surface 54 of the carrier body 46 may at least partially include a plurality of ridges 56 that define a stepped interior profile, and the plurality of ridges 56 are adapted to support one or more components that may be received into the interior portion 16 of the carrier body 46 in a manner that will be described in more detail below. The carrier body 46 may be free from windows or apertures, or, in the alternative, may have one or more windows, apertures, and/or open portions that extend from the outer surface 52 into the interior portion 16. A first end 60 of the carrier body 46 may have a substantially vertical (i.e., a direction that is generally perpendicular to the ground surface 50) end wall 62, and a second end 64 of the carrier body 46 may have a rounded portion 66, as shown in FIG. 4. A first cylindrical wall 68a may project from the outer surface 52 of the carrier body 46 adjacent to the second end 64. The first cylindrical wall 68a may extend in a horizontal direction that is perpendicular to the carrier axis 48. A first body bore 70a may be defined by the first cylindrical wall 68a and may extend into the interior portion 16. A second cylindrical wall 68b having a second body bore 70b may be disposed on the carrier body 46 opposite the first cylindrical wall 68a, and the second cylindrical wall 68b and second body bore 70b may be coaxially aligned with and identical to the first cylindrical wall 68a and first body bore 70a.

Referring to FIGS. 1-4, 6, and 13, the wheel carrier 12 may also include a top projection 72. The top projection 72 may have a first end 74 that is coupled to the outer surface 52 of the carrier body 46 and a second end 76 that extends away from the outer surface 52. The top projection 72 may extend away from the outer surface 52 of the carrier body 46 at an oblique angle relative to the carrier axis 48, and the top projection 72 may be symmetrical about a vertical plane that passes through the carrier axis 48. A slot 78 may be formed through the top projection 72 adjacent to the second end 76 such that a first projection arm 80a and a second projection arm 80b are formed. An interior surface of the first projection arm 80a may be separated from an interior surface of the second projection arm 80b by a distance that is slightly greater than the width of a first end 32 of a stabilizer bar 30. A first projection aperture 82a may extend through the first projection arm 80a in a direction that is both horizontal and perpendicular to the carrier axis 48, and a second projection aperture 82b may extend through the second projection arm 80b such that a central axis of the first projection aperture 82a is coaxial with a central axis of the second projection aperture 82b. The top projection 72 and the carrier body 46 may be formed as a unitary body or may be formed as an assembly of two or more parts. For example, the top projection 72 may be welded to the carrier body 46 to form the wheel carrier 12. The wheel carrier 12 may be constructed of a metal, such as steel, a steel alloy, or aluminum, for example. The features of the wheel carrier 12 may be machined and/or die cast.

As illustrated in FIGS. 1-3, 7-9, and 13, the control arm 18 of the independent rear wheel drive assembly 10 may include an elongated control body 84 that extends along a substantially horizontal arm axis 85. The control body 84 may have any suitable cross-sectional shape, such as a square, a rectangle, a circle, an oval, or a polygon. For example, the control body 84 may have a circular cross-sectional shape such that the control body 84 takes the shape of a cylinder, as illustrated in FIG. 1. The control body 84 may have an outer surface 86 and an inner surface 88, and the inner surface 88 may define an interior portion 24 that extends along the entire length of the control body 84. The interior portion 24 may have the same cross-sectional shape as the control body 84 or it may be different. In the disclosed embodiment, the interior portion 24 has a circular cross-sectional shape and the diameter of the inner surface 88 may be dimensioned to receive a portion of the drive shaft assembly 38 in a manner that will be described in greater detail below. The control body 84 may be free from windows or apertures, or, in the alternative, may have one or more windows, apertures, and/or open portions that extend from the outer surface 86 into the interior portion 24. The yoke 90a and 90b may be of any suitable construction having spherical rod ends that are rotatably coupled in any manner known to the art or may be constructed or formed from a metal, such as steel, a steel alloy, or aluminum and of such shape as round, angular, or oval to form such a connection in any manner known to the art. A first yoke 90a may be disposed at a first end 20 of the control arm 18. The first yoke 90a may be partially formed by a planar end wall 92a that is substantially vertical. A yoke aperture 94a may be formed in the end wall 92a. The yoke aperture 94a may correspond in size to the diameter of the inner surface 88 of the control body 84 such that the yoke aperture 94a partially defines the interior portion 24. A planar first side wall 96a may horizontally extend from a first end portion 98a of the end wall 92a and a planar second side wall 100a may horizontally extend from a second end portion 102a of the end wall 92a. Each of the first and second side walls 96a, 100a may have a rounded leading edge portion 104a that is generally symmetrical about the arm axis 85. A side wall aperture 106a may be formed in each of the first and second side walls 96a, 100a such that the side wall apertures 106a are coaxially aligned. The central axes of the side wall apertures 106a may be horizontally disposed and perpendicular to the arm axis 85. An interior surface 108a of the first side wall 96a may be separated from an interior surface 110a of the second side wall 100a by distance that is slightly greater than the distance between an end portion of the first cylindrical wall 68a of the a wheel carrier 12 and an end portion of the second cylindrical wall 68b of the wheel carrier 12.

Still referring to FIGS. 1-3, 7-9, and 13, the control arm 18 may also include a second yoke 90b disposed at a second end 22 of the control arm 18 such that the control body 84 extends between the first yoke 90a and the second yoke 90b. The second yoke 90b may be substantially identical to the first yoke 90a. Specifically, the second yoke 90b may be partially formed by a planar end wall 92b that is substantially vertical. A yoke aperture 94b may be formed in the end wall 92b. The yoke aperture 94b may correspond in size to the diameter of the inner surface 88 of the control body 84 such that the yoke aperture 94b partially defines the interior portion 24. A planar first side wall 96b may horizontally extend from a first end portion 98b of the end wall 92b such that the first side wall 96b is substantially coplanar with the first side wall 96a of the first yoke 90a. A planar second side wall 100b may horizontally extend from a second end portion 102b of the end wall 92b such that the second side wall 100b is substantially coplanar with the second side wall 100a of the first yoke 90a. Each of the first and second side walls 96a, 100a may have a rounded leading edge portion 104b that is generally symmetrical about the arm axis 85. A side wall aperture 106b may be formed in each of the first and second side walls 96b, 100b such that the side wall apertures 106b are coaxially aligned. The central axes of the side wall apertures 106b may be horizontally disposed and perpendicular to the arm axis 85. The control body 84, the first yoke 90a, and the second yoke 90b may be formed as a unitary body or may be formed as an assembly of two or more parts. For example, each of the first and second yoke 90a, 90b may be welded to the control body 84 to form the control arm 18. The control arm 18 may be comprised of a metal, such as steel, a steel alloy, or aluminum. The features of the control arm 18 may be machined and/or die cast.

Figure 10:
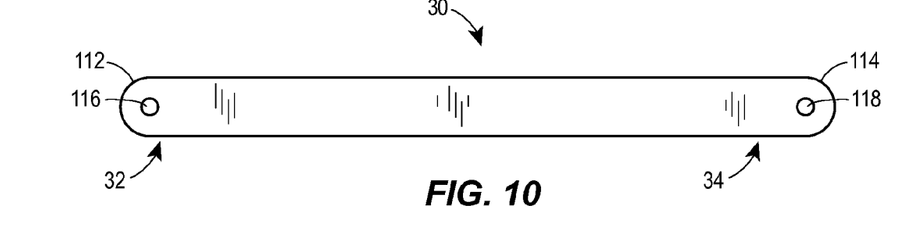
FIG. 10 is a side view of a stabilizer arm of the assembly of the present disclosure.
Figure 11:
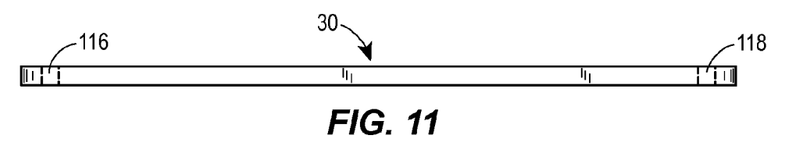
FIG. 11 is top view of the embodiment of the stabilizer arm illustrated in FIG. 10.
Figure 12:
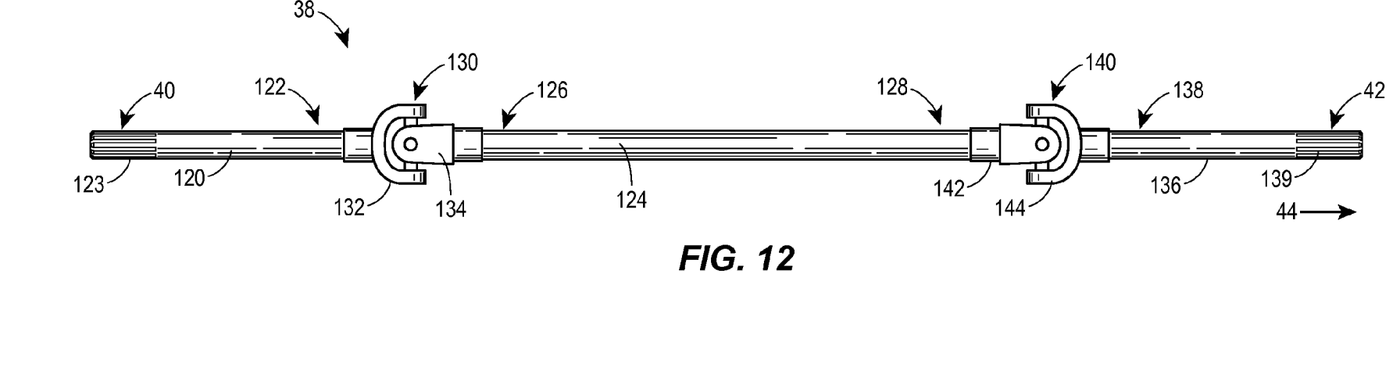
FIG. 12 is a side view of a drive shaft assembly of the assembly of the present disclosure.

As illustrated in FIGS. 1, 3, 10-11, and 13, the stabilizer bar 30 of the independent rear wheel drive assembly 10 may be formed from an elongated bar having a first end 32 and a second end 34. The stabilizer bar 30 may have any suitable cross-sectional shape such as that of a circle, oval, rectangle, square, polygon, or any combination thereof. For example, the stabilizer bar 30 may have a rectangular cross-sectional shape having a uniform thickness along the length of the stabilizer bar 30, as illustrated in FIGS. 10 and 11. The stabilizer bar may have a rounded portion 112 adjacent to the first end 32 and a rounded portion 114 adjacent to the second end 34. A first bar aperture 116 may be disposed adjacent to the first end 32 and a second bar aperture 118 may be disposed adjacent to the second end 34. The first end 32 of the stabilizer bar 30 may be received into the slot 78 formed between the first projection arm 80a and the second projection arm 80b of the wheel carrier 12. So configured, the first bar aperture 116 is coaxially aligned with both the first and second projection apertures 82a, 82b. When the second end 34 of the stabilizer bar 30 is pivotably coupled to a the differential housing 170 in a manner that will be described in greater detail below, the stabilizer bar 30 may be substantially horizontal. In an alternative embodiment, the stabilizer bar 30 may have a circular cross-sectional shape having spherical rod ends that are rotatably coupled to the wheel carrier 12 and the differential housing 170. The stabilizer bar 30 may be formed from a single piece of metal, such as steel, a steel alloy, or aluminum.

Referring to FIGS. 1-3, 12, and 13, the independent rear wheel drive assembly 10 also includes a drive shaft assembly 38 to transmit rotational power from the power transmission assembly 44 to the wheel 14. The drive shaft assembly 38 may include a substantially cylindrical distal shaft portion 120 having a first end 40 and a second end 122. The first end 40 may have a splined portion 123 that is adapted to be received into a flange assembly 158 that is coupled to the wheel 14. The drive shaft assembly 38 may also include a substantially cylindrical middle shaft portion 124 having a first end 126 and a second end 128. Each of the distal shaft portion 120 and that middle shaft portion 124 may be coupled by a first universal joint 130. More specifically, the second end 122 of the distal shaft portion 120 may be received into a first yoke portion 132 of the first universal joint 130 and the first end 126 of the middle shaft portion 124 may be received into a second yoke portion 134 of the first universal joint 130. The first universal joint 130 allows an input rotation from the middle shaft portion 124 to result in an output rotation by the distal shaft portion 120 while also allowing the shaft portions 120, 124 to be relatively displaced such that a longitudinal axis of the distal shaft portion 120 is not coaxial with a longitudinal axis of the middle shaft portion 124.

Still referring to FIGS. 1-3, 12, and 13, the drive shaft assembly 38 also may include a substantially cylindrical proximal shaft portion 136 having a first end 138 and a second end 42. The second end 42 may have a splined portion 139 that is adapted to be received into a splined bore (not shown) formed in the power transmission assembly 44. Each of the proximal shaft portion 136 and middle shaft portion 124 may be coupled by a second universal joint 140. More specifically, the second end 128 of the middle shaft portion 124 may be received into a first yoke portion 142 of the second universal joint 140 and the first end 138 of the proximal shaft portion 136 may be received into a second yoke portion 144 of the second universal joint 140. Similar to the first universal joint 130, the second universal joint 140 allows an input rotation from the proximal shaft portion 136 to result in an output rotation by the middle shaft portion 124 while also allowing the shaft portions 124, 136 to be relatively displaced such that a longitudinal axis of the middle shaft portion 124 is not coaxial with a longitudinal axis of the proximal shaft portion 136. An input rotation of the proximal shaft portion 136 results in an output rotation of the distal shaft portion 120, while allowing for relative motion between any or all of the distal shaft portion 120, the middle shaft portion 124, and proximal shaft portion 136.

Figure 2:
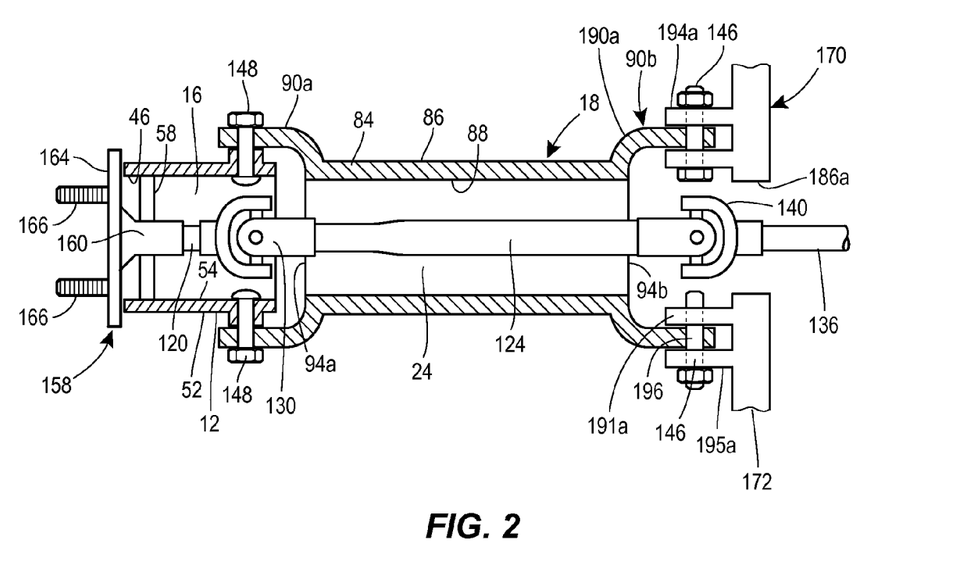
FIG. 2 is top partial sectional view of the embodiment of the independent rear wheel drive assembly illustrated in FIG. 1 taken along the line 2-2 of FIG. 1, with the wheel removed for illustrative purposes.

As illustrated in FIGS. 1, 2, and 13, a flange assembly 158 may be coupled to the first end 40 of the distal shaft portion 120 of the drive shaft assembly 38. The flange assembly 158 may include a cylindrical hub portion 160 having a bore 162 extending longitudinally through the hub portion 160. The bore 162 may be internally splined such that the splined portion 123 of the distal shaft portion 120 is received into the bore 162 and a rotation of the distal shaft portion about its longitudinal axis results in a corresponding rotation of the hub portion 160 about its longitudinal axis. The hub portion 160 may be received within the bore of a bearing assembly 58 (illustrated in FIG. 1), and the bearing assembly 58 may be secured within the interior portion 16 of the carrier body 46 by one or more of the ridges 56. However, the bearing assembly 58 may be secured within the interior portion 16 of the carrier body 46 in any manner known in the art. So configured, the bearing assembly 58 allows the hub portion 160 of the flange assembly 158 to rotate relative to the carrier body 46 while maintaining the longitudinal axis of the hub portion 160 in a substantially coaxial relationship with the carrier axis 48 of the carrier body 46. The flange assembly 158 may also include a planar flange portion 164 disposed at a distal end of the hub portion 160 such that the flange portion 164 extends orthogonal to the longitudinal axis of the hub portion 160. The flange portion 164 may be integrally formed with the hub portion 160. However, the flange portion 164 may be coupled to the hub portion 160 by any means known in the art. A plurality of threaded projections 166 may extend from an outer surface of the flange portion 164, and each of the threaded projections 166 may extend through a corresponding aperture formed in a hub of the wheel 14. A nut 168 may be threaded to engage each threaded projection 166 to secure the wheel 14 to the flange assembly 158.

Referring now to FIGS. 3 and 13 to 16, the independent rear wheel drive assembly may also include a differential housing 170 adapted to both protect the power transmission assembly 44 and to provide stable attachment points for the control arm 18 and the stabilizer bar 30. The differential housing 170 may include a first end wall 172 that may be substantially planar and may be disposed in a vertical direction. A second end wall 174 may be parallel to and offset from the first end wall 172. The first end wall 172 may have a plurality of concave curved edge portions 176a that cooperate to define an upper wall portion 178a, a lower wall portion 180a, a first side wall portion 182a, and a second side wall portion 184a. A shaft bore 186a may extend along a longitudinal axis 188, and the longitudinal axis may be disposed midway between a distal end of the upper wall portion 178a and a distal end of the lower wall portion 180a. A pair of first lugs 190a, 191a may project from an outer surface 192a of the first end wall 172, and the pair of first lugs 190a, 191a may be symmetrically disposed about the shaft bore 186a. A pair of second lugs 194a, 195a may also project from the outer surface 192a of the first end wall 172, and the pair of second lugs 194a, 195a may be disposed outward of the pair of first lugs 190a, 191a. Each of the first lugs 190a, 191a and second lugs 194a, 195a may have a bore extending perpendicular to the longitudinal axis 188, and each of the bores may be coaxially aligned. A pair of third lugs 196a, 197a may also project from the outer surface 192a of the first end wall 172. The pair of third lugs 196a, 197a may be disposed on the upper wall portion 178a, and the pair of third lugs 196a, 197a may be symmetrically disposed about a vertical axis that intersects the longitudinal axis 188.

Referring again to FIGS. 3 and 13 to 16, the differential housing 170 may include a second end wall 174 that may be parallel to and offset from the first end wall 172. The second end wall 174 may have a plurality of concave curved edge portions 176b that cooperate to define an upper wall portion 178b, a lower wall portion 180b, a first side wall portion 182b, and a second side wall portion 184b. A shaft bore 186b may extend along the longitudinal axis 188 such that the shaft bore 186b of the second end wall 174 is coaxially aligned with the shaft bore 186a of the first end wall 172. A pair of first lugs 190b, 191b may project from an outer surface 192b of the second end wall 174, and the pair of first lugs 190b, 191b may be symmetrically disposed about the shaft bore 186b. A pair of second lugs 194b, 195b may also project from the outer surface 192b of the first end wall 172, and the pair of second lugs 194b, 195b may be disposed outward of the pair of first lugs 190b, 191b. Each of the first lugs 190b, 191b and second lugs 194b, 195b may have a bore extending perpendicular to the longitudinal axis 188, and each of the bores may be coaxially aligned. A pair of third lugs 196b, 197b may also project from the outer surface 192b of the second end wall 174. The pair of third lugs 196b, 197b may disposed on the upper wall portion 178b, and the pair of third lugs 196b, 197b may be symmetrically disposed about a vertical axis that intersects the longitudinal axis 188. So configured, the second end wall 174 may be mirror image of the first end wall 172, but the distance between the distal end of the lower wall portion 180b of the second end wall 174 may be less that the distance between the distal end of the lower wall portion 180a of the first end wall 172.

Still referring to FIGS. 3 and 13 to 16, the differential housing 170 may further include a planar intermediate wall 198 that may be substantially planar and may be disposed in a vertical direction. The intermediate wall 198 may be disposed between the first end wall 172 and the second end wall 174, and the intermediate wall 198 may include a shaft bore 186c that extends along the longitudinal axis 188 such that the shaft bore 186c of the intermediate wall 198 may be coaxially aligned with both the shaft bore 186b of the second end wall 174 and the shaft bore 186a of the first end wall 172.

Figure 3:
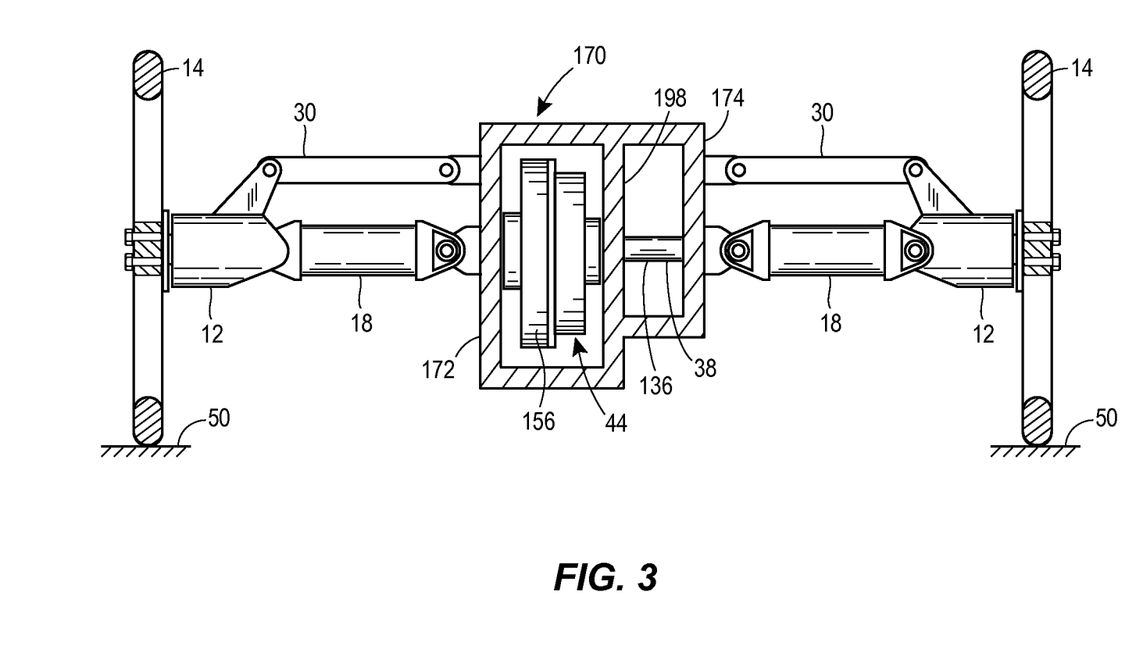
FIG. 3 is a schematic representation of a front view of an independent rear wheel drive assemblies coupled to a motorcycle frame.

Referring again to FIGS. 3 and 13 to 16, the differential housing 170 may include an elongated top support member 200 that may have a uniform rectangular cross-sectional shape. The top support member 200 may be secured to the distal end of the upper wall portion 178a of the first end wall 172 and the distal end of the upper wall portion 178b of the second end wall 174 such that the top support member 200 is substantially horizontal. The differential housing 170 may also include an elongated intermediate support member 202 that may have a uniform rectangular cross-sectional shape. The intermediate support member 202 may be secured to a distal end of the second side wall portion 184a of the first end wall 172 and the distal end of the second side wall portion 184a of the second end wall 174 such that the intermediate support member 202 is substantially horizontal. The differential housing 170 may also include an elongated first bottom support member 204 that may have a uniform rectangular cross-sectional shape, and the first bottom support member 204 may be secured to a distal end of the lower wall portion 180a of the first end wall 172 and an end portion of the intermediate wall 198 such that the first bottom support member 204 is substantially horizontal. Additionally, the differential housing 170 may also include an elongated second bottom support member 206 that may have a uniform rectangular cross-sectional shape, and the second bottom support member 206 may be secured to a distal end of the lower wall portion 180b of the second end wall 174 and a portion of the intermediate wall 198 such that the first bottom support member 204 is substantially horizontal. Assembled as described, the power transmission assembly 44 and the sprocket 156 are adapted to be rotatably supported by bearings between the intermediate wall 198 and the first end wall 172, as illustrated in FIG. 3.

To couple the independent rear wheel drive assembly 10 to a vehicle frame, the rear wheel support assembly of a conventional two-wheeled motorcycle may be removed from the motorcycle frame (not shown). Generally speaking, this rear wheel support assembly (not shown), which is commonly known as a swing arm assembly, typically includes a rear sub-frame that is pivotably hinged to a portion of a main motorcycle frame by one or more hinge pins. A sprocket may be coupled to the sub-frame such that the sprocket can rotate relative to the sub-frame. A rear wheel may be fixedly coupled to the sprocket such that a rotation of the sprocket via a chain coupled to the motorcycle's engine results in a corresponding rotation of the rear wheel. One or more shock absorbers may be fixed to both a portion of the sub-frame and the main motorcycle frame to, for example, reduce the impact force felt by a user when the rear wheel contacts a rock or other piece of debris on the road surface. To remove the typical swing arm assembly, the chain coupling the engine to the sprocket is first removed, as is the one or more shock absorbers. The one or more hinge pins may then be removed, and the swing arm assembly can be disengaged from the main motorcycle frame. The foregoing description of the swing arm assembly is for illustrative purposes only, and other embodiments of the swing arm assembly may be known in the art.

Following the removal of the swing arm assembly, the independent rear wheel drive assembly 10 may be coupled to the motorcycle frame. Specifically, as illustrated in FIG. 13, a swing arm replacement 208 may be pivotably hinged to a portion of the main motorcycle frame by one or more hinge pins (not shown) that may extend along a horizontal axis 218. The swing arm replacement 208 may be a bifurcated yoke having a first arm 210 and a second arm 212 that each extends away from a central support portion 214. A distal portion of the first arm 210 may be received into a mating slot 216a formed in the distal end of the first side wall portion 182a of the first end wall 172 of the differential housing 170, and one or more mechanical fasteners, such as bolts, may secure the distal portion of the first arm 210 to the first end wall 172. A distal portion of the second arm 212 may be received into a mating slot 21 formed in the distal end of the first side wall portion 182b of the second end wall 174 of the differential housing 170, and one or more mechanical fasteners, such as bolts, may secure the distal portion of the second arm 212 to the second end wall 174. So assembled, the swing arm replacement 208 and the differential housing 170 may pivot relative to the motorcycle frame about the horizontal axis 218.

Referring to FIGS. 1 to 3, 7, and 13, the second end 22 of the control arm 18 is pivotably coupled to the first end wall 172 of the differential housing 170. More specifically, the first side wall 96b of the second yoke 90b of the control arm 18 may be inserted between the first lug 191a and the second lug 195a of the first end wall 172 such that the bores of the first lug 191a and the second lug 195a are coaxially aligned with the side wall aperture 106b of the first side wall 96b of the second yoke 90b. In addition, the second side wall 100b of the second yoke 90b of the control arm 18 may be inserted between the first lug 190a and the second lug 194a of the first end wall 172 such that the bores of the first lug 190a and the second lug 194a are coaxially aligned with the side wall aperture 106b of the second side wall 100b of the second yoke 90b. A first hinge pin 146 may be inserted through the bores of the first lug 191a and the second lug 195a and the side wall aperture 106b of the first side wall 96b of the second yoke 90b, and a second hinge pin 146 may be inserted through the bores of the first lug 190a and the second lug 194a and the side wall aperture 106b of the second side wall 100b of the second yoke 90b, and the central axes of the first and second hinge pins 146 may be coaxially aligned. So coupled, the control arm 18 may pivot relative to the first end wall 172 of the differential housing 170 about the central axes of the hinge pins 146, and the pivotal rotation may be confined to a vertical plane.

Similarly, the first end 20 of the control arm 18 is pivotably coupled to the wheel carrier 12. In particular, a hinge pin 148 may be inserted through each of the side wall apertures 106a disposed on each of the first side wall 96a and second side wall 100a of the first yoke 90a of the control arm 18. Each of these hinge pins 148 may also be received into a corresponding body bore 70a, 70b disposed on opposite ends of the carrier body 46 of the wheel carrier 12 such that the central axes of the hinge pins 148 are coaxial. So configured, the control arm 18 may pivot relative to the wheel carrier 12 about the central axes of the hinge pins 148, and the pivotal rotation may be confined to a vertical plane.

In addition, as illustrated in FIGS. 1-3 and 13, the first end 32 of the stabilizer bar is pivotably coupled to the wheel carrier 12. Specifically, the first end 32 of the stabilizer bar 30 many be positioned within the slot 78 of the top projection 72 of the wheel carrier 12 such that the first projection aperture 82a, the second projection aperture 82b, and the first bar aperture 116 are coaxially aligned. So aligned, a hinge pin 150 may be inserted through each of the first projection aperture 82a, the second projection aperture 82b and the first bar aperture 116, thereby allowing for rotation of the stabilizer bar 30 relative to the wheel carrier 12 about a central axis of the hinge pin 150, and the pivotal rotation may be confined to a vertical plane. Also, the second end 34 of the stabilizer bar 30 may be pivotably coupled to the first end wall 172 of the differential housing 170. More specifically, the second end 34 of the stabilizer bar 30 may be inserted in the space between the third lugs 196a, 197a of the first end wall 172 such that the bores of the third lugs 196a, 197a are coaxially aligned with the second bar aperture 118 of the stabilizer bar 30. A hinge pin 152 may be inserted through the second bar aperture 118 and the bores of the third lugs 196a, 197a, thereby allowing for rotation of the stabilizer bar 30 relative to the first end wall 172 of the differential housing 170 about a central axis of the hinge pin 152, and the pivotal rotation may be confined to a vertical plane. Assembled as described, the stabilizer bar 30, the control arm 18, and the wheel carrier 12 form a linkage that allows the wheel carrier 12 to move upwardly or downwardly in a substantially vertical direction while maintaining the carrier axis 48 of the carrier body 46 in a substantially horizontal orientation. With the carrier axis 48 in such a horizontal orientation, a wheel 14 that is rotatably coupled to the wheel carrier 14 will be remain substantially vertical relative to the ground surface 50. A shock absorber (not shown) may be mounted to a portion of the differential housing 170 and a portion of the control arm 18 in any manner common in the art.

With the stabilizer bar 30, the control arm 18, and the wheel carrier 12 secured to the differential housing 170 as described above, the drive shaft assembly 38 may be coupled to both the wheel 14 and the power transmission assembly 44, as shown in FIGS. 1-3, 12, 13, and 17. More specifically, the second end 42 of the proximal shaft portion 136 of the drive shaft assembly may extend through the shaft bore 186a of the first end wall 172 of the differential housing 170 to engage a differential or any other portion of the power transmission assembly 44 such that a rotational output of the power transmission assembly 44 results in a corresponding rotation of the proximal shaft portion 136. For example, the second end 42 of the proximal shaft portion 136 may include a splined portion 139, and the splined portion 139 of the second end 42 may be received into a splined bore (not shown) formed in the differential. However, the second end 42 of the proximal shaft portion 136 may be rotatably coupled to the power transmission assembly 44 by any means known in the art. With the proximal shaft portion 136 coupled to the power transmission assembly 44 as described, the proximal shaft portion 136 may extend in a substantially horizontal direction such that all or part of the second universal joint 140 may be disposed between the interior surfaces 108b, 110b of the second yoke 90b of the control arm 18. However, the second universal joint 140 may be disposed at any suitable location relative to the second yoke 90b. The second universal joint 140 may be sized such that the no portion of the second universal joint 140 contacts any portion of the vehicle frame 28 or the control arm 18 when the proximal shaft portion 136 and the middle shaft portion 124 rotate and/or are relatively displaced.

Referring to FIGS. 1 to 3 and 12, the middle shaft portion 124, which has a second end 128 coupled to the second universal joint 140, may extend through the interior portion 24 of the control body 84 such that a longitudinal axis of the middle shaft portion 124 may be substantially coaxial with the arm axis 85. The middle shaft portion 124 may extend through the entire interior portion 24 of the control body 84 of the control arm 18 such that the first end 126 of the middle shaft portion 124 extends beyond the yoke aperture 94a of the first yoke 90a and the second end 128 of the middle shaft portion 124 extends beyond the yoke aperture 94b of the first yoke 90b. The interior surface 88 of the control body 84 of the control arm 18 may be dimensioned such that no portion of the middle shaft portion 124 contacts the interior surface 88 when the middle shaft portion 124 is displaced relative to the proximal shaft portion 136 and/or the distal shaft portion 120.

The first universal joint 130 may be coupled to the first end 126 of the middle shaft portion 124, and at least a portion of the first universal joint 130 may be disposed within the interior portion 16 of the carrier body 46 of the wheel carrier 12. The first universal joint 130 may be sized such that no portion of the first universal joint 130 contacts the inner surface 54 of the carrier body 46 when the distal shaft portion 120 and the middle shaft portion 124 rotate and/or are relatively displaced. However, the first universal joint 130 may be disposed at any suitable location relative to the wheel carrier 12 and the control arm 18. The distal shaft portion 120, which has a second end 122 coupled to the first universal joint 130, may extend in a substantially horizontal direction within the interior portion 16 of the wheel carrier 12 such that a longitudinal axis of the distal shaft portion 120 may be substantially coaxial with the carrier axis 48. The first end 40 of the distal shaft portion 120 may be coupled to the flange assembly 158 and the wheel 14 may be secured to the flange assembly 158 in the manner previously described.

As illustrated in FIG. 3, an additional stabilizer bar 30 and control arm 18 may be pivotably coupled to the second end wall 174 of the differential housing 170 in the same manner as the stabilizer bar 30 and control arm 18 is pivotably coupled to the first end wall 172 of the differential housing 170. An additional wheel carrier 12 may also be coupled to the stabilizer bar 30 and control arm 18, and an additional shaft assembly 38 may be coupled to both the power transmission assembly 44 and an additional wheel 14 in the manner described above.

Assembled as described, the drive shaft assembly 38 will maintain the horizontal orientation of both the proximal shaft portion 136 and the distal shaft portion 120 when the wheel carrier 12 is vertically displaced relative to the differential housing 170 due to, for example, depressions on the ground surface 50. With the independent rear wheel drive assembly 10 coupled to a motorcycle frame as described above, a drive chain (not show) may be coupled to both the vehicle's engine (not shown) and a sprocket 156 coupled to the power transmission assembly 44. As configured, the rotation of the engine may rotate the motorcycle's wheels 14 in a conventional manner.

As discussed above, a first portion of the drive shaft assembly 38 is disposed within the interior portion 16 of the wheel carrier 12 and a second portion of the drive shaft assembly 38 is disposed within the interior portion 24 of the control arm 18. So configured, the drive shaft assembly 38 is advantageously protected from potentially damaging contact from debris on the road, such as rocks and tree branches, etc. Moreover, in this configuration, space is conserved beneath the drive shaft assembly 38, thereby increasing the ground clearance between the road surface and the independent rear wheel drive assembly 10. In addition, the relatively low weight of the independent rear wheel drive assembly 10 contributes to a smoother and more comfortable ride.

While various embodiments have been described above, this disclosure is not intended to be limited thereto. Variations can be made to the disclosed embodiments that are still within the scope of the appended claims.

What is claimed:

1. An independent rear wheel drive assembly for use in three-wheeled vehicles, the independent rear wheel drive assembly comprising:
   a wheel carrier adapted to rotatably support a wheel, the wheel carrier having an interior portion;
   a control arm having a first end, a second end, and an interior portion, wherein the first end of the control arm is pivotably coupled to the wheel carrier for pivotal rotation and the second end of the control arm is pivotably coupled to a housing that is adapted to be coupled to a vehicle frame;
   a stabilizer bar having a first end and a second end, wherein the first end of the stabilizer bar is pivotably coupled to the wheel carrier for pivotal rotation and the second end of the stabilizer bar is pivotably coupled to the housing; and
   a drive shaft assembly having a first end and a second end, wherein the first end is adapted to be coupled to the wheel and the second end is adapted to be coupled to a power transmission assembly, wherein a first portion of the drive shaft assembly is disposed within the interior portion of the wheel carrier and a second portion of the drive shaft assembly is disposed within the interior portion of the control arm,
   wherein the housing is a differential housing, and wherein the differential housing is coupled to a swing arm replacement that is adapted to be pivotably secured to a portion of the vehicle frame.

2. The assembly of claim 1, wherein the stabilizer bar has one of a rectangular cross-sectional shape or a cylindrical cross-sectional shape.

3. The assembly of claim 1, wherein each of the control arm, the stabilizer bar, and the drive shaft assembly extends in a horizontal direction.

4. The assembly of claim 1, wherein
   the pivotal rotation between the first end of the control arm and the wheel carrier is confined to a vertical plane,
   a pivotal rotation between the second end of the control arm and the first portion of the housing is confined to a vertical plane,
   the pivotal rotation between the first end of the stabilizer bar and the wheel carrier is confined to a vertical plane, and
   a pivotal rotation between the second end of the stabilizer bar and the second portion of the housing is confined to a vertical plane.

5. The assembly of claim 1, wherein the first end of the drive shaft assembly is coupled to a flange assembly, and the flange assembly is coupled to the wheel.

6. The assembly of claim 1, wherein the wheel carrier has a carrier body and a top projection extending from the carrier body, and wherein the first end of the stabilizer bar is pivotably coupled to the top projection and the first end of the control arm is pivotably coupled to the carrier body.

7. The assembly of claim 6, wherein the carrier body has a cylindrical shape.

8. The assembly of claim 1, wherein a first yoke is disposed at the first end of the control arm and a second yoke is disposed at the second end of the control arm.

9. The assembly of claim 8, wherein an elongated control body extends between the first yoke and the second yoke, and the control body at least partially defines the interior portion of the control arm.

10. The assembly of claim 9, wherein the control body has a cylindrical shape.

11. The assembly of claim 9, wherein each of the first yoke and the second yoke includes a planar end wall, a planar first side wall that extends from a first end portion of the end wall, and a planar second side wall that extends from a second end portion of the end wall.

12. The assembly of claim 11, wherein a yoke aperture is formed in the end wall of each of the first yoke and second yoke such that each of the yoke apertures partially defines the interior portion of the control arm.

13. The assembly of claim 1, wherein the drive shaft assembly includes a distal shaft portion, a middle shaft portion, and a proximal shaft portion, and wherein the first end of the drive shaft assembly is a first end of the distal shaft portion and the second end of the drive shaft assembly is a second end of the proximal shaft portion.

14. The assembly of claim 13, wherein the distal shaft portion and the middle shaft portion are coupled by a first universal joint, and the middle shaft portion and the proximal shaft portion are coupled by a second universal joint.

15. The assembly of claim 13, wherein the first portion of the drive shaft assembly is a portion of the distal shaft portion and the second portion of the drive shaft assembly is a portion of the middle shaft portion.

16. The assembly of claim 13, wherein each of the first end of the distal shaft portion and the second end of the proximal shaft portion is splined.

17. An independent rear wheel drive assembly for use in three-wheeled vehicles, the independent rear wheel drive assembly comprising:
- a wheel carrier adapted to rotatably support a wheel, the wheel carrier having an interior portion;
- a control arm having a first end, a second end, and an interior portion, wherein the first end of the control arm is pivotably coupled to the wheel carrier for pivotal rotation and the second end of the control arm is pivotably coupled to a housing that is adapted to be coupled to a vehicle frame;
- a stabilizer bar having a first end and a second end, wherein the first end of the stabilizer bar is pivotably coupled to the wheel carrier for pivotal rotation and the second end of the stabilizer bar is pivotably coupled to the housing; and
- a drive shaft assembly having a first end and a second end, wherein the first end is adapted to be coupled to the wheel and the second end is adapted to be coupled to a power transmission assembly, wherein a first portion of the drive shaft assembly is disposed within the interior portion of the wheel carrier and a second portion of the drive shaft assembly is disposed within the interior portion of the control arm,
- wherein a first yoke is disposed at the first end of the control arm and a second yoke is disposed at the second end of the control arm, wherein an elongated control body extends between the first yoke and the second yoke, and the control body at least partially defines the interior portion of the control arm, and wherein each of the first yoke and the second yoke includes a planar end wall, a planar first side wall that extends from a first end portion of the end wall, and a planar second side wall that extends from a second end portion of the end wall.

18. The assembly of claim 17, wherein the housing is a differential housing, and wherein the differential housing is coupled to a swing arm replacement that is adapted to be pivotably secured to a portion of the vehicle frame.

19. The assembly of claim 17, wherein
- the pivotal rotation between the first end of the control arm and the wheel carrier is confined to a vertical plane,
- a pivotal rotation between the second end of the control arm and the first portion of the housing is confined to a vertical plane,
- the pivotal rotation between the first end of the stabilizer bar and the wheel carrier is confined to a vertical plane, and
- a pivotal rotation between the second end of the stabilizer bar and the second portion of the housing is confined to a vertical plane.

20. The assembly of claim 17, wherein the wheel carrier has a carrier body and a top projection extending from the carrier body, and wherein the first end of the stabilizer bar is pivotably coupled to the top projection and the first end of the control arm is pivotably coupled to the carrier body.

* * * * *